Feb. 15, 1966  S. I. JOHNSON ETAL  3,235,271
FLEXIBLE SHAFT SEAL HAVING A TILTING SEALING LIP
Filed Sept. 1, 1964   5 Sheets-Sheet 1

INVENTORS.
Stephen I. Johnson
BY Arthur L. Ludwig
ATTORNEY.

Feb. 15, 1966  S. I. JOHNSON ETAL  3,235,271
FLEXIBLE SHAFT SEAL HAVING A TILTING SEALING LIP
Filed Sept. 1, 1964  5 Sheets-Sheet 5

INVENTORS
STEPHEN I. JOHNSON
ARTHUR L. LUDWIG
BY *Munson H. Lane*
ATTORNEY

3,235,271
FLEXIBLE SHAFT SEAL HAVING A TILTING SEALING TIP

Stephen I. Johnson and Arthur L. Ludwig, Hastings, Mich., assignors to Hastings Manufacturing Company, Hastings, Mich., a corporation of Michigan
Filed Sept. 1, 1964, Ser. No. 394,651
36 Claims. (Cl. 277—47)

This application is a continuation-in-part of our earlier, copending application Serial No. 311,728, filed September 26, 1963, now abandoned.

This invention relates to new and useful improvements in shaft seals, and the principal object of the invention is to effectively prevent leakage of fluids around reciprocably and/or rotatably mounted shafts, rods, stems, and the like.

As such, several embodiments of the invention are disclosed, some of these embodiments being particularly adapted for sealing the valve stems of internal combustion engines without requiring any modification of the engine structure. However, the same as well as other disclosed embodiments also have general utility for sealing various other types of reciprocable stems, rods or shafts, while still other of the disclosed embodiments are particularly suitable for sealing rotating shafts of various types.

The principal feature which characterizes all embodiments of the invention is the provision of a resiliently flexible annular seal having an internal sealing lip to engage a shaft, rod or stem on which the seal is positioned, the seal having such a cross-sectional configuration that when pressure is applied axially thereto, the sealing lip is urged into a tight frictional sealing engagement with the shaft, rod or stem, by a characteristic tilting or canting action to prevent leakage of fluids around the same.

Some of the advantages of the invention reside in its simplicity of construction, efficient and dependable operation, and convenient and economical manufacture.

With the foregoing object and features in view and such other objects and features as may become apparent as this specification proceeds, the invention will be understood from the following description taken in conjunction with the accompanying drawings, wherein like characters of reference are used to designate like parts, and wherein:

Reference is now drawn to the accompanying drawings in detail and more particularly to FIGS. 1–5 thereof, wherein one embodiment of the invention is shown as used for sealing the valve stem of an internal combustion engine. The body or block 1 of the engine has a cylinder 2 provided with a passage 3 controlled by the valve 4 which coacts with a valve seat 5 surrounding the passage. The body 1 also has a guide 6 for the valve stem 7, the guide being provided with a tubular bearing 8, the outer end of which projects from the body 1 of the engine and terminates in a planar end surface 9, constituting a seal member seat, as will hereinafter be pointed out. A valve actuating member 10 is pivotally mounted as at 11, the actuating rod 12 being conventionally shown.

Figures 1, 2, 3, 4, 5, 6, 7, 8:
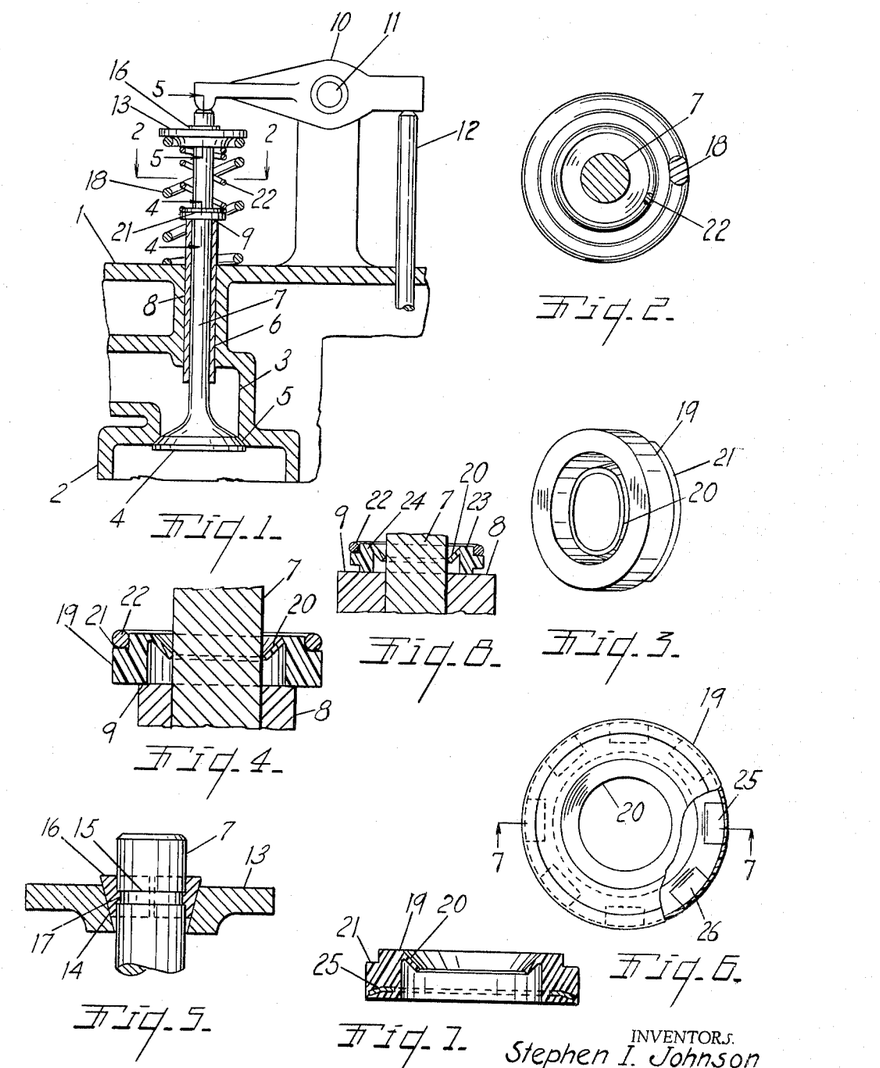
FIGURE 1 is a fragmentary view, mainly in vertical section, showing one embodiment of the invention adapted to the valve stem of an internal combustion engine.
FIGURE 2 is an enlarged cross-sectional view, taken substantially in the plane of the line 2—2 in FIGURE 1.
FIGURE 3 is an enlarged perspective view of the seal unit shown in FIGURE 1.
FIGURE 4 is an enlarged, fragmentary vertical sectional view, taken substantially in the plane of the line 4—4 in FIGURE 1.
FIGURE 5 is an enlarged, fragmentary vertical sectional view, taken substantially in the plane of the line 5—5 in FIGURE 1.
FIGURE 6 is a plan view, partly broken away, of a modified form of the invention.
FIGURE 7 is a cross-sectional view, taken substantially in the plane of the line 7—7 in FIGURE 6.
FIGURE 8 is a fragmentary sectional view, similar to that shown in FIGURE 4, but illustrating another modified form.

A thrust collar or member 13 is provided on the valve stem 7 in spaced relation from the bearing end 9, the collar having a tapered stem receiving bore or opening 14 while the portion of the stem received in the collar has an annular groove 15, as shown in FIG. 5. A pair of complemental, tapered keepers 16 are positioned in the bore 14 of the collar and provided with internal lugs 17 which seat in the groove 15 in accordance with conventional practice, a compression spring 18 being interposed between the body 1 and the collar 13 in surrounding relation with the stem 7 so as to urge the valve 4 to its closed position.

The valve stem sealing unit comprises a unitary seal member 19 formed from resiliently flexible material such as rubber, neoprene, plastic, or the like, the member 19 having an annular body for encircling the valve stem with the inner wall of the annular body being somewhat greater in diameter than the stem, yet small enough so that the base of the body may be supportably positioned on the aforementioned seat 9 constituted by the end of the bearing 8. As shown in FIG. 4, the diameter of the outer wall of the seal body exceeds the diameter of the bearing 8, so that the seal projects to a substantial extent radially outwardly beyond the seat 9. An annular sealing lip 20, formed integrally with the seal body, projects inwardly and downwardly from the inner wall of the seal body at the top thereof to sealingly engage the stem 7. The outer wall at the top of the seal body is formed with an annular thrust receiving shoulder 21 which forms a seat for one end of a compression spring 22, the other end of the spring 22 bearing against the thrust collar 13. The spring 22 is under sufficient pressure at all times to apply thrust in an axial direction to the shoulder 21, whereby distortion or turning movement is set up throughout the seal body 19, tending to cant the sealing lip 20 inwardly into a tight, frictional sealing engagement with the stem 7 and thus preventing leakage of fluids through the bearing 8 around the stem. The spring 22 also serves to sealingly press the seal body 19 against the seat 9, and since the lip 20 is relatively thin and flexible, any fluids escaping from the engine through the bearing 8 into the seal body will assist in pressing the lip 20 against the stem 7, in addition to the sealing thrust exerted upon the seal body by the spring 22. It will be also noted that as the stem 7 is slid downwardly to open the valve 4, a greater compressive force will be applied to the spring 22, thus causing the lip 20 to exert even a greater sealing action when the valve is open than when it is closed.

In the modified embodiment of FIG. 8 the seal member 23 has a somewhat smaller diameter at the outside thereof than the member 19 so that it does not project beyond the outside diameter of the bearing 8 but has its body 24 contained wholly within the diametrical confines of the seat 9.

The embodiment of the seal in FIGS. 6 and 7 is substantially the same as that of FIGS. 1–4, except that the base portion of the seal member 19 has embedded therein an annular reinforcing member 25 with circumferentially spaced, outwardly projecting portions 26.

While the embodiments of the invention shown in FIGS. 1–8 have been specifically described in association with an internal combustion engine valve, it will be readily apparent that the same may be used generally with any reciprocating stem, rod, shaft, or the like, around which a sealing action is desired to prevent leakage of fluids. Thus, the utility of those embodiments is to be construed broadly, as is that of some of the other modified embodiments hereinafter described, in terms of sealing means for reciprocating shafts in general.

With this in mind, attention is now directed to FIGS. 9–12 wherein 27 generally designates any reciprocable stem, rod or shaft, slidably mounted in a sleeve bearing 28 in a machine body 29, the end surface of the bearing 28 affording a support surface or seat 30 for a seal unit 31. A suitable thrust collar 32 is secured to the shaft 27 and a compression spring 33 is positioned on the shaft between the collar 32 and the seal unit 31 for exerting axial thrust upon the latter, as will be hereinafter explained.

In the embodiment of FIGS. 9–12 the seal unit 31 comprises a resiliently flexible seal member or body 34 of an annular configuration, the same having an inner wall 35, an outer wall 36, a base end or portion 37 of a substantially semi-circular cross-section, and an opposite end which may be referred to as the thrust receiving end 38. The outer wall 36 at the end 38 is provided with an annular thrust receiving shoulder 39, it being noted that this shoulder is spaced or offset radially outwardly from the median diameter of the base portion 37. An annular sealing lip 40, formed integrally with the member or body 34, projects inwardly from the inner wall 35 at the end 38 and is inclined or sloped from the plane of the end 38 in the direction of the base end 37. Thus, the lip 40 is substantially frusto-conical, and terminates at its inner edge in a tubular ring portion 40' adapted to sealingly engage the shaft 27.

Figure 9:
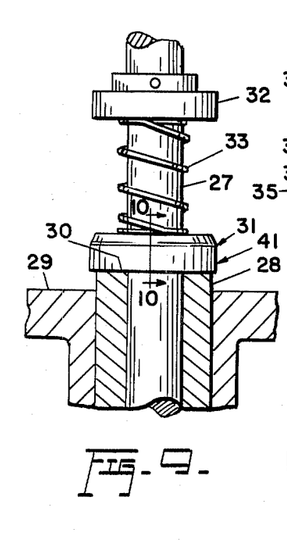
FIGURE 9 is a fragmentary view, partly in section and partly in elevation, of another modified embodiment.
Figure 10:
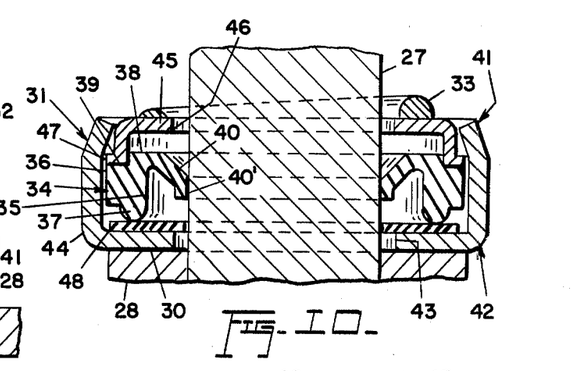
FIGURE 10 is an enlarged, fragmentary sectional view, taken substantially in the plane of the line 10—10 in FIGURE 9.
Figure 11:
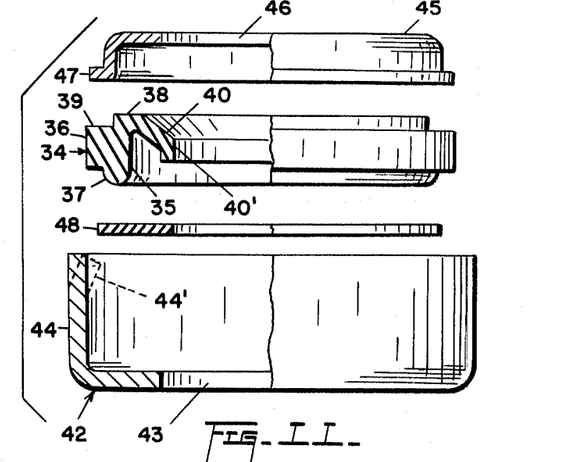
FIGURE 11 is a group view, partly in elevation and partly in section, of the components of the seal unit of FIGURES 9 and 10.
Figure 12:
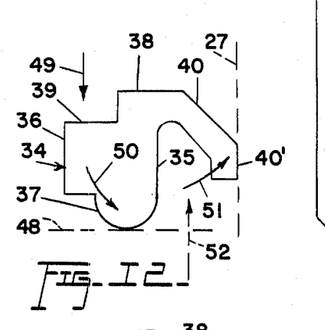
FIGURE 12 is a diagrammatic illustration of the operation of the seal.

The seal member 34 as a whole is contained in a capsule 41 which is preferably of metallic construction and includes a cup-shaped receptacle 42 having a bottom provided with an opening 43 to freely receive the shaft 27 and also having a cylindrical side wall portion 44 which has a slightly larger inside diameter than the outside diameter of the seal member 34. The capsule 41 also includes a separate cover 45 in the form of an inverted dish, the cover having a shaft receiving opening 46 and a depending marginal flange 47, adapted to seat on the shoulder 39 of the seal member 34.

A gasket 48 of rubber, neoprene, plastic, or the like, is placed on the bottom of the receptacle 42, whereupon the seal member 34 is positioned in the receptacle on top of the gasket and the cover 45 is superposed on the seal member, with the flange 47 of the cover seated on the shoulder 39 of the seal member, as aforesaid. The upper edge portion of the receptacle side wall 44 is deformable radially inwardly as indicated at 44' in FIG. 11, whereby the parts are held assembled as shown in FIG. 10, while permitting the cover 45 to move axially inwardly toward the bottom of the receptacle 42 for exerting pressure on the seal 34. The spring 33 bears against the cover 45 as shown in FIG. 10, applying axial pressure thereto in the direction of the arrow 49 as diagrammatically illustrated in FIG. 12. This axial pressure is transmitted by the flange 47 of the cover to the shoulder 39 of the resiliently flexible seal member 34, which causes a distortion or turning movement to be set up throughout the body of the seal member as indicated at 50, tending to cant the sealing lip 40 in the direction of the end 38 of the seal and to press the lip portion 40' inwardly into a tight, frictional sealing engagement with the shaft 27. The rounded base portion 37 of the seal member, of course, provides a bearing surface which seats on the gasket 48 on the bottom of the receptacle 42, the latter in turn being in abutment with the seating surface 30 on the shaft bearing 28. Thus, a pivot point is provided by the engagement of the rounded surface 37 with the gasket 48 (FIG. 12) which in this case serves as an abutment, thus providing a smooth canting or turning movement within the body of the seal which urges the inner end of the lip 40 against the shaft when pressure is applied to the thrust surface 39. This pivotal movement is indicated by the arrows 49, 50 and 51 in FIG. 12. If any fluid under pressure should escape around the shaft 27 through the bearing 28 into the seal member, as shown by the dotted arrow 52, such fluid will react against the lip 40 and assist in pressing the lip portion 40' against the shaft, in addition to the axial thrust exerted on the sealing member by the spring 33.

Figure 13:
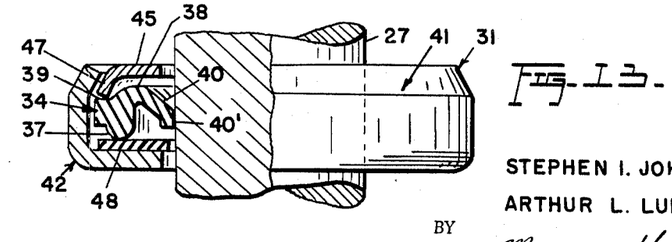
FIGURE 13 is a fragmentary view, partly in section and partly in elevation, showing another modified embodiment.

The modified embodiment of the seal unit 31 shown in FIG. 13 is structurally the same as that in FIGS. 9–11 except that the axial thickness of the seal member 34 is reduced, thus affording a corresponding reduction in the thickness of the capsule 41 to permit installation of the seal unit in locations where space restrictions are encountered.

FIGS. 14–17 illustrate another modified embodiment of a seal unit used with a reciprocating shaft 27, the unit in this instance comprising a seal member 34 which is substantially the same as that in the embodiment of FIGS. 9–11 but is contained in a bottomless capsule 54, the bottom edge of the capsule being provided with an outturned annular flange 55. The inside diameter of this flange is greater than the diameter of the seat 30 and the base portion 37 of the seal member 34 is supported by the gasket 48 which engages the seat 30. The upper edge of the capsule 54 is provided with an inturned annular flange 56 which seats on the annular shoulder 39 of the seal member, and the compression spring 33 is interposed between the collar 32 and the flange 55 of the capsule 54, whereby axial thrust may be transmitted by the flange 56 to the seal member 34 to urge the lip portion 40′ of the latter into a sealing engagement with the shaft 27. The side wall of the capsule 54 is provided at circumferentially spaced points with slots 57 which are open at and through the bottom flange 55, regions of the side wall at opposite sides of the slots being indented as at 58 to provide keeper means for retaining the seal member 34 in the capsule 54.

Figures 14, 15, 16, 17, 18, 19:
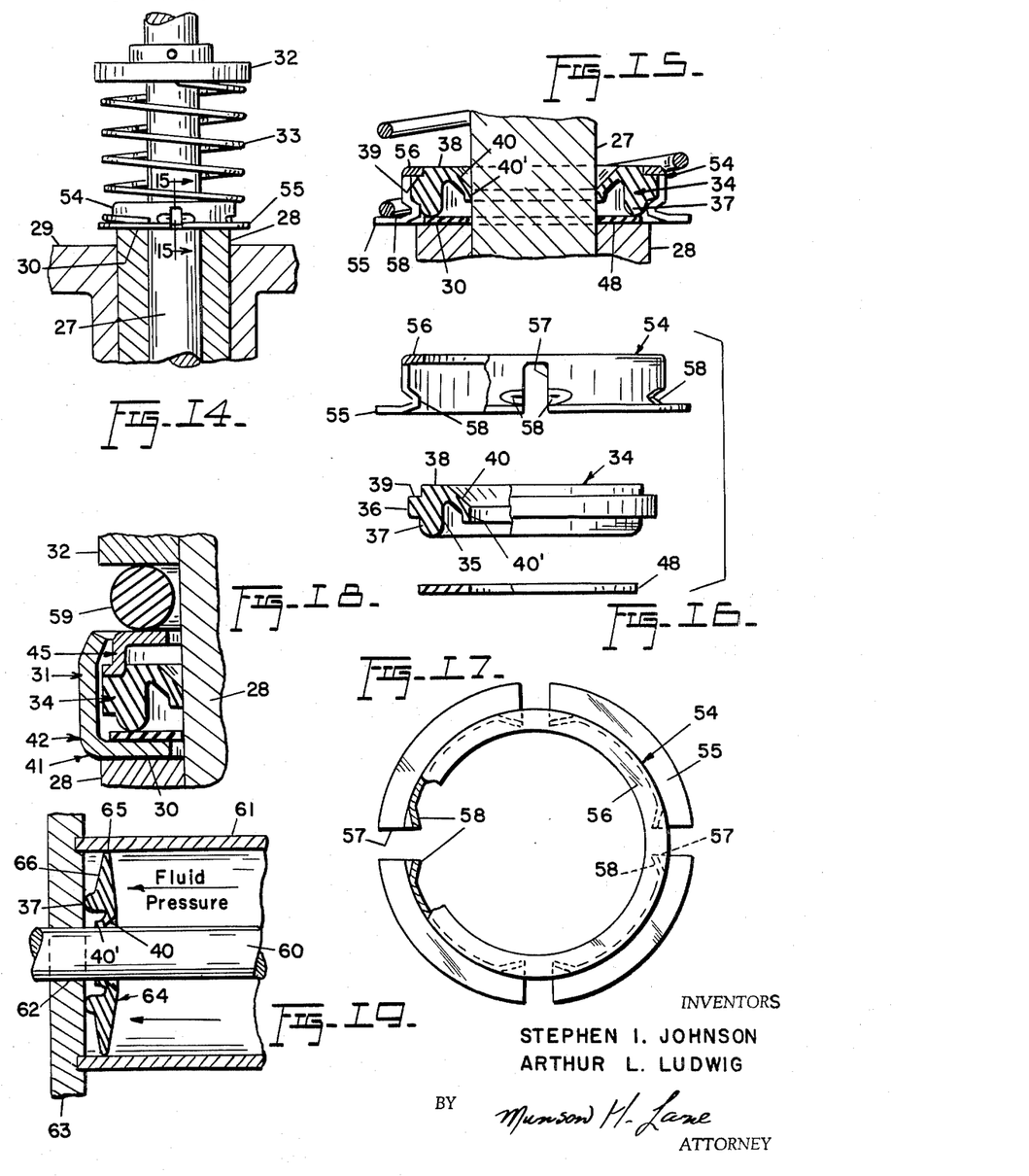
FIGURE 14 is a fragmentary view, partly in section and partly in elevation, of another embodiment.
FIGURE 15 is an enlarged, fragmentary sectional view, taken substantially in the plane of the line 15—15 in FIGURE 14.
FIGURE 16 is a group view, partly in elevation and partly in section, of the components of the seal unit of FIGURES 14 and 15.
FIGURE 17 is a plan view, partly in section, of the seal cap used in the embodiment of FIGURES 14–16.
FIGURE 18 is a fragmentary sectional view showing another modified form of the invention.
FIGURE 19 is a fragmentary sectional view of another modified embodiment.

In the further modified embodiment of FIG. 18 the aforementioned seal unit 31 is shown but without the spring 33. In this embodiment the axial thrust on the seal unit is provided by a resiliently compressible O ring 59 which is interposed between the thrust collar 32 and the cover 45 of the capsule 41, as will be apparent.

FIG. 19 illustrates another modified embodiment, wherein fluid pressure rather than mechanical thrust is utilized for urging a seal into engagement with a shaft. This embodiment is primarily intended for use with a rotating shaft such as the shaft 60 which is disposed in a cylinder 61 containing fluid under pressure and is rotatably journalled in a bearing 62 in an end plate 63 of the cylinder. The seal member 64 of resiliently flexible material is positioned on the shaft adjacent the end plate, the seal member having a bearing portion 37, a lip 40 and a lip portion 40′ to engage the seal, the bearing portion 37 being in abutment with the plate 63. The outer marginal edge 65 of the seal member engages the inner side wall of the cylinder 61 and the outer portion 66 of the seal member, outwardly of the bearing portion 37, is of a greater radial dimension than the inner portion or lip 40. Thus, the fluid in the cylinder 61 exerts a greater axial pressure on the seal portion 66 than on the lip 40, thus setting up a distortion or turning movement throughout the seal body and pressing the lip portion 40′ into a tight sealing engagement with the shaft 60.

FIGS. 20–23 show other embodiments of sealing means for rotating shafts such as the shaft 60. For example, in FIGS. 21 and 22, the shaft 60 is rotatably mounted in an anti-friction bearing 67 seated against a shoulder 68 at the inner end of a counterbore 69 in a machine body 70. A resiliently flexible seal member 71 is positioned in the counterbore, with its lip portion 40′ engaging the shaft 60 and its bearing portion 37 abutting the bearing 67. A compression spring 72 is interposed between the shoulder 39 of the seal member and a cover plate 73 of the counterbore 69, the cover plate being removably secured to the machine body 70 by suitable screws 74. It will be apparent that the axial thrust of the spring 72 against the shoulder 39 will urge the lip portion 40′ into sealing engagement with the shaft 60.

Figure 20:
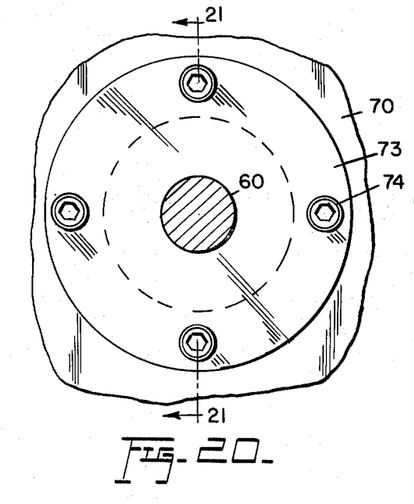
FIGURE 20 is an elevational view of another modified embodiment.
Figure 21:
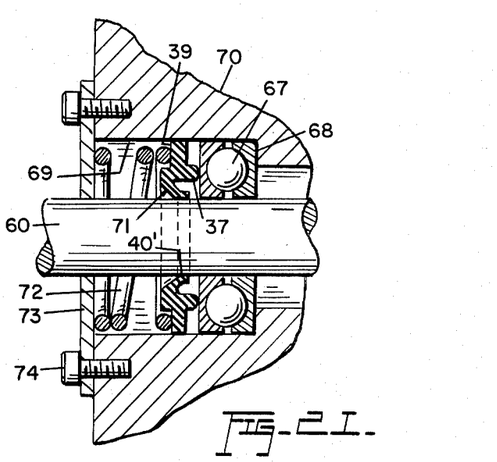
FIGURE 21 is a sectional view, taken substantially in the plane of the line 21—21 in FIGURE 20.
Figure 22:
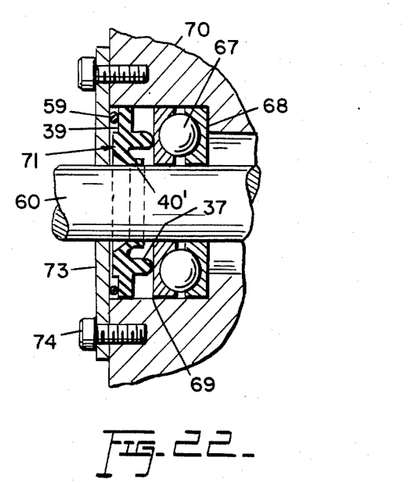
FIGURE 22 is a sectional view, similar to FIGURE 21, but showing another modification.

The arrangement shown in FIG. 22 is substantially the same as in FIGS. 20–21, except that the counterbore 69 is relatively shallow and the compression spring 72 is substituted by a resiliently compressible O ring 59 which is interposed between the seal shoulder 39 and the cover plate 73.

Figure 23:
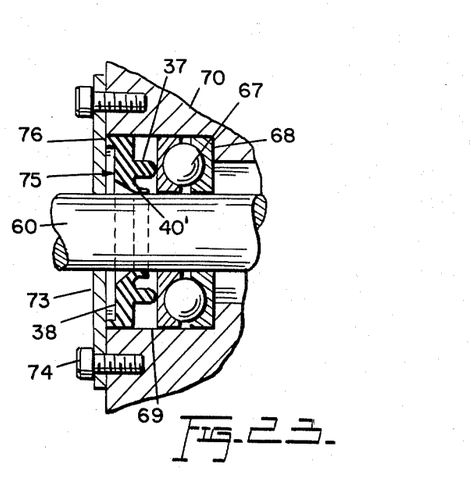
FIGURE 23 is a sectional view, similar to FIGURE 21, but showing still another modification.
Figure 24:
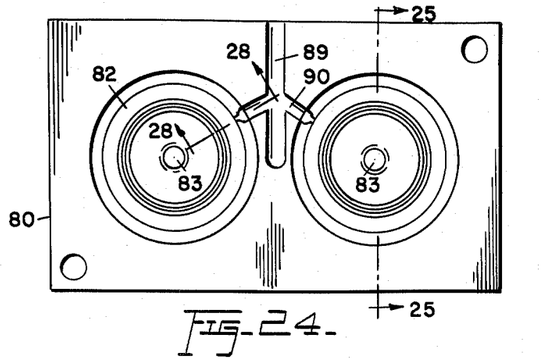
FIGURE 24 is a plan view of one half of a typical mold such as may be used in manufacture of the seal.
Figure 25:
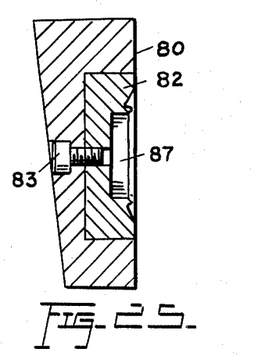
FIGURE 25 is a sectional view, taken substantially in the plane of the line 25—25 in FIGURE 24.
Figure 26:
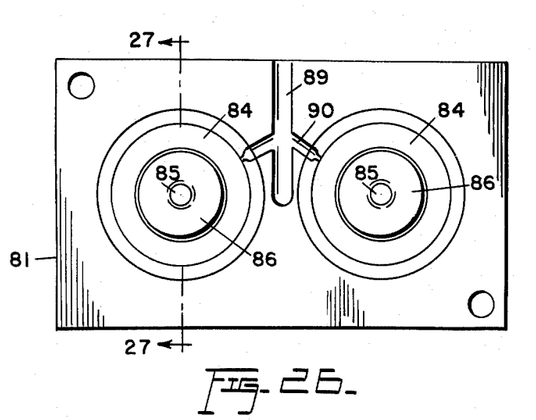
FIGURE 26 is a plan view showing the other half of the mold.
Figure 27:
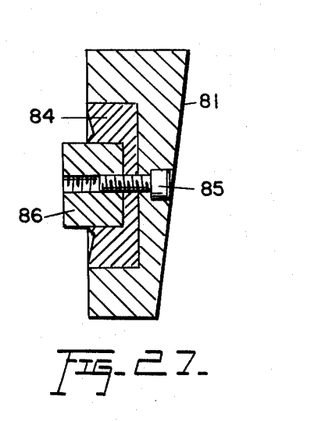
FIGURE 27 is a sectional view, taken substantially in the plane of the line 27—27 in FIGURE 26.
Figure 28:
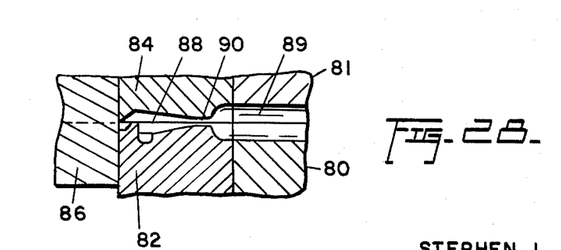
FIGURE 28 is an enlarged, fragmentary sectional detail, taken substantially in the plane of the line 28—28 in FIGURE 24 but with the two halves of the mold assembled.

In the modified arrangement of FIG. 23 the resiliently flexible seal member 75 is not provided with a recessed shoulder such as the shoulder 39, but is formed with an annular thrust receiving shoulder 76 which projects axially from the seal end 38 so that it may abut the end plate 73. This arrangement eliminates the use of a spring or an O ring, the axial thrust on the seal being produced by the resiliency of the seal body itself, reacting from the abutment of the shoulder 76 with the plate 73.

FIGS. 24–28 illustrate mold apparatus such as may be used for injection molding of the seal members used in the various embodiments of the invention.

The apparatus comprises a pair of conventional mold blanks 80, 81 which are adapted to be separably secured together in opposing relation, the blank 80 being recessed to receive a pair of identical molds 82 held in place by screws 83, while the blank 81 is similarly recessed to receive a pair of identical molds 84 for coaction with the molds 82. The molds 84 are held in place by screws 85 which also retain plugs 86 in the molds 84, such plugs being received in sockets 87 of the molds 82. The faces of the molds 84, 82 which come into abutment when the blanks 81, 80 are assembled are machined to form a cavity as at 88 in FIG. 28, the cavity corresponding to the cross-section of a particular seal member which is to be molded. The material to be molded is injected simultaneously into the two cavities 88 of the molding apparatus through passage means 89, 90, formed in the blanks 80, 81 and in the molds 82, 84, as will be apparent.

While in the foregoing there have been described and claimed the preferred embodiments of the invention, various other modifications may become apparent to the skilled in the art to which the invention relates. Accordingly, it is not desired to limit the invention to this disclosure and various modifications and equivalents may be resorted to, falling within the spirit and scope of the invention as claimed.

What is claimed as new is:

1. A flexible seal for a shaft, comprising an annular body portion formed from elastomeric material and having an inner wall and an outer wall, a support surface for said body portion, said body portion also including a base end adapted to rest against said support surface, and an opposite thrust receiving end, an annular sealing lip projecting inwardly from said inner wall approximate said thrust receiving end and inclined from the plane of the thrust receiving end toward said base end, said sealing lip having an inner sealing surface, said base end having an annular bearing surface, said thrust receiving end having an annular thrust receiving shoulder adjacent said outer wall and spaced radially outwardly from the median diameter of said base bearing surface, said base end of the body portion being normally out of engagement with said support surface at its outer edge portion to permit canting of the sealing lip so that when thrust is applied to said thrust receiving shoulder a turning movement is set up throughout the seal, tending to cant said sealing lip toward said thrust receiving end and compress the sealing lip so that its inner sealing surface has a smaller diameter than when no thrust is applied to said seal.

2. The seal as defined in claim 1 wherein said sealing lip includes a frusto-conical portion extending inwardly from said inner wall and a tubular terminal portion.

3. The seal as defined in claim 1 together with a capsule enclosing the same.

4. The seal as defined in claim 3 wherein said capsule includes an open base receptacle and a separate cover slidably positioned in said receptacle and bearing on said thrust receiving end of said seal.

5. The seal as defined in claim 4 wherein said receptacle includes a circular bottom portion having a central shaft receiving aperture, and a cylindrical wall portion of an inside diameter slightly greater than the diameter of said outer wall of the seal, said seal being encased within said capsule so that said base end of the seal rests on said bottom portion of said receptacle with said cylindrical wall portion of the receptacle closely encompassing said outer wall of the seal.

6. The seal as defined in claim 5 wherein said separate capsule cover includes a disc portion having a central shaft receiving aperture, and a depending flange integral with the outer edge of said disc portion, said cover being slidably mounted in said receptacle so that said disc portion of the cover extends over said thrust receiving end of the seal and said flange of the cover rests against said thrust receiving shoulder of the seal.

7. The combination of a shaft guide having a seat at one end thereof, a shaft reciprocable in said guide, a thrust collar on said shaft spaced from said seat, and a unitary seal member for said shaft, said seal member being formed from resilient material and comprising an annular body portion supportedly seated on said seat with a substantial annular portion of the body thereof projecting outwardly from the seat and provided with an annular shoulder, said shoulder being disposed in outwardly spaced relation from the guide seat on which the seal member is seated, said seal member having an integral flexibly resilient inwardly projecting annular portion disposed with its inner edge in sealing engagement with said shaft, and a thrust spring disposed with one end thereof in engagement with said thrust collar and its other end in engagement with said shoulder of the seal member.

8. The combination of a body member having a shaft guide including a tubular portion projecting from the body member and having a seat at its outer end, a shaft reciprocable in said guide and projecting outwardly therefrom, a thrust collar on said shaft spaced outwardly from the outer end of said guide, a unitary seal member for said shaft, said seal member being formed from resilient material and comprising an annular body portion supportably seated on said seat with a substantial portion of the body thereof projecting outwardly from said guide and provided with a shoulder disposed in outwardly spaced relation from the guide seat on which said seal member is seated, said seal member having an integral flexibly resilient inwardly projecting annular portion disposed in sealing engagement with said shaft, a shaft biasing spring supportedly mounted on said body member with its outer end in engagement with said thrust collar on said shaft, and a seal member thrust spring disposed within said shaft biasing spring with its outer end in engagement with said collar and its inner end in engagement with said shoulder of the seal member in radially outwardly spaced relation from the guide on which said seal member is seated.

9. The combination of a body member having a shaft guide, a shaft reciprocable in said guide and projecting therefrom, a seal member for said shaft formed from resilient material and comprising an annular body portion supportedly seated on the outer end of said guide with a portion thereof projecting outwardly from the guide and provided with a spring seating shoulder disposed in outwardly spaced relation from said guide on which said seal member is seated, said seal member having an integral flexibly resilient inwardly projecting portion disposed with its inner edge in sealing engagement with said shaft, and a seal member thrust spring having its outer end supportedly connected to said shaft and its inner end in thrust engagement with said shoulder of said seal member.

10. The combination of a body member having a shaft guide, a shaft reciprocable in said guide and projecting therefrom, a seal member for said shaft formed from resilient material and supportedly mounted on said guide with an annular portion thereof projecting from the guide and provided with a spring seating shoulder disposed in laterally spaced relation from the end of said guide on which the seal member is seated, said seal member having a flexibly resilient inwardly projecting portion disposed with its inner edge in sealing engagement with said shaft, and a coil spring having its outer end supportedly connected to said shaft and its inner end in thrust engagement with said shoulder of said seal member and acting to tiltingly act upon said seal member whereby its shaft engaging portion is urged into sealing engagement with said shaft.

11. The combination of a body member having a shaft guide, a shaft reciprocable in said guide and projecting therefrom, a seal member for said shaft comprising a body portion of flexibly resilient material supportedly mounted on said guide and having a substantial portion projecting outwardly from its guide engaging portion and provided with a spring seating shoulder, said seal member having an inwardly projecting flexibly resilient annular portion with which said shaft is in reciprocating engagement, and a thrust spring supportedly connected at its outer end to said shaft with its inner end in engagement with said shoulder of said seal member.

12. The combination of a body member, a shaft reciprocable in said body member and projecting therefrom, an annular seal member for said shaft comprising a body portion of flexibly resilient material supportedly mounted on said body member and having a substantial portion thereof projecting outwardly from its body member engaging portion, said seal member having an inwardly projecting flexibly resilient annular portion with which said shaft is in reciprocating engagement, and a thrust spring supportedly connected at its outer end to said shaft with its inner end in engagement with said outwardly projecting portion of said seal member.

13. The combination of a body member, a shaft reciprocably mounted in said body member, an annular seal member for said shaft comprising a body portion of flexibly resilient material supportedly mounted on said body member and having an inwardly projecting portion of a greater resilience than said body portion sealingly coacting with said shaft, said seal member having an annular outer portion not in supported engagement with said body member, and a thrust spring supportedly connected at its outer end to said shaft with its inner end in thrust engagement with said annular outer portion of the seal member which is not in supported engagement with said body member.

14. The combination of a body member having a shaft guide projecting therefrom, said guide having an outwardly facing seat at its outer end, a reciprocable shaft mounted in said guide and having a thrust collar disposed in outwardly spaced relation from said seat, a shaft biasing spring mounted on said body member and coacting with said collar, an annular seal member formed from resilient material and comprising an annular body portion supportedly seated on said seat with a substantial portion of said body portion projecting outwardly from said guide and provided with a spring seating shoulder disposed in radially outwardly spaced relation from said guide on which the seal member is seated, said seal member having an integral flexibly resilient inwardly inclined annular portion disposed in sealing engagement with said shaft, and a thrust spring disposed with its outer end in thrust engagement with said collar and with its inner end in engagement with said shoulder in radially outwardly spaced relation from said guide, said thrust spring acting to urge the edge of said shaft engaging annular portion into sealing engagement with said shaft.

15. The combination of a body member, a shaft reciprocable in said body member and projecting outwardly therefrom, said body member having an annular seat surrounding said shaft, and an annular seal member for said shaft comprising a body portion of flexibly resilient material supportedly mounted on said seat and having a portion thereof projecting outwardly from the seat, said seal member having an annular angularly disposed inwardly inclined flexibly resilient portion with which said shaft is in reciprocable engagement, and a thrust spring connected at its outer end to said shaft with its inner end in engagement with the body portion of the seal member and acting to tiltingly stress the seal member and urge its shaft engaging portion into sealing engagement with said shaft.

16. A seal for a movable shaft, comprising a body formed from elastomeric material and having an inner edge, and an outer edge, an abutment surface for said edge, said body also including an abutment face and an opposite thrust receiving face, an annular inner edge portion of said abutment face being engageable with said abutment surface with the outer edge portion of the abutment face out of engagement with such surface, and an annular lip projecting inwardly from and formed integrally with the inner edge of said body, said lip having an inner shaft engaging edge and being inclined in the direction of the stated abutment surface, so that when axial thrust is applied to the outer edge portion of said thrust receiving face, turning movement is set up throughout the seal for urging the inner edge of said lip into a tight sealing engagement with a shaft to which the seal is applied.

17. The seal as defined in claim 16 wherein said lip includes a substantially frusto-conical portion connected to the inner edge of said body, and a tubular terminal portion providing said shaft engaging inner edge.

18. The combination of a shaft, a seat surrounding the shaft, and a seal for said shaft, said seal comprising a body formed from elastomeric material and having an inner edge, an outer edge, an abutment face and an opposite thrust receiving face, an annular inner edge portion of said abutment face being in engagement with said seat with the outer edge portion of the abutment face out of engagement with the seat, and an annular lip formed integrally with and projecting inwardly from said inner edge of said body, said lip having an inner edge in engagement with said shaft and being inclined in the direction of said seat, so that when axial thrust is applied to the outer edge portion of said thrust receiving face, turning movement is set up throughout the seal for urging said inner edge of said lip into a tight sealing engagement with said shaft.

19. The combination as defined in claim 18 wherein said axial thrust is applied to the thrust receiving face of said body by fluid under pressure.

20. The combination as defined in claim 18 wherein said seal is disposed in a chamber containing fluid under pressure, the outer edge of the seal body engaging the side wall of said chamber and the fluid in the chamber exerting an axial thrust on the thrust receiving face of the seal body.

21. The combination as defined in claim 18 together with a thrust producing element surrounding said shaft, said element being resiliently compressible in an axial direction and adapted to exert an axial thrust on said outer edge portion of the thrust receiving face of said seal body.

22. The combination as defined in claim 21 wherein said thrust producing element comprises a ring of elastomeric material.

23. The combination as defined in claim 22 wherein said ring is formed integrally with said outer edge portion of the thrust receiving face of said seal body.

24. The combination of a shaft, a seat surrounding the shaft, a seal for said shaft comprising a body formed from elastomeric material and having an inner edge, an outer edge, an abutment face and an opposite thrust receiving face, annular abutment means formed integrally on and projecting axially from the inner edge portion of the abutment face of said body and engaging said seat with the outer edge portion of the abutment face out of engagement with the seat, an annular lip formed integrally with and projecting inwardly from said inner edge of the body, said lip having an inner edge in engagement with said shaft and being inclined in the direction of said seat, the outer edge portion of the thrust receiving face of said body forming an annular shoulder extending radially outwardly beyond said annular abutment means, a reaction element surrounding said shaft in axially spaced relation from said seal, and a thrust producing element interposed between said reaction element and said shoulder of the seal body, said thrust producing element being resiliently compressible in an axial direction and applying thrust to said shoulder whereby a turning movement is set up throughout the seal body for urging the inner edge of said lip into a tight sealing engagement with said shaft.

25. The combination as defined in claim 24 wherein said reaction element is carried by said shaft.

26. The combination as defined in claim 24 including mounting means for said shaft, said reaction element being carried by said mounting means.

27. The combination as defined in claim 24 together with a rigid capsule containing said seal, said capsule including a receptacle having an annular flange interposed between said seat and said annular abutment means of the seal body, and a cover movable axially in said receptacle, said cover bearing against said annular shoulder of the seal body and being engaged by said thrust producing element.

28. The combination as defined in claim 24 together with a rigid capsule containing said seal, said capsule including one annular flange portion bearing against said annular shoulder of the seal body, and another annular flange portion engaged by said thrust producing element.

29. The combination as defined in claim 24 together with a rigid capsule enclosing said seal, said capsule including an annular flange portion bearing against said annular shoulder of the seal body for exerting axial thrust thereon under the influence of said thrust producing element.

30. The combination of a machine member having bearing means for a rotating shaft, a seal for said shaft comprising a body formed from elastomeric material and having an inner edge, an outer edge, an abutment face and an opposite thrust receiving face, an annular inner edge portion of the abutment face of said body engaging said bearing means with the outer edge portion of the abutment face out of engagement with the bearing means, an annular lip formed integrally with and projecting inwardly from said inner edge of the body, said lip having an inner edge in engagement with said shaft and inclined in the direction of said bearing means, and means for exerting axial thrust on the outer edge portion of the thrust receiving face of said body, whereby turning movement may be set up throughout the seal for urging the inner edge of said lip in tight sealing engagement with said shaft.

31. The combination as defined in claim 30 together with a thrust reaction element provided on said machine member in axially spaced relation from said seal, said thrust exerting means being interposed between said seal and said reaction element.

32. The combination as defined in claim 30 wherein said machine member is provided with a counterbore forming a seat for said bearing means, said seal being disposed in said counterbore, and a counterbore cover provided on said machine member, said thrust exerting means being disposed in the counterbore between said seal and said cover.

33. The combination as defined in claim 32 wherein said thrust producing means comprise a compression spring bearing at one end thereof against said cover and at its other end against the outer edge portion of said thrust receiving face of said seal body.

34. The combination as defined in claim 32 wherein said thrust producing means comprise an elastomeric ring bearing with one side thereof against said cover and with its other side against the outer edge portion of said thrust receiving face of said seal body.

35. The combination as defined in claim 32 wherein said thrust producing means comprise an elastomeric ring formed integrally with and projecting axially from said outer edge portion of the thrust receiving face of said seal body, said ring bearing against said cover.

36. A seal for movable shafts, comprising an annular body formed from elastomeric material having a central opening therethrough to receive a shaft or the like and having an inner edge, and an outer edge, an abutment face and an opposite thrust receiving face, a raised and rounded annular inner edge portion of said abutment face being engageable with an abutment surface with the outer edge portion of the abutment face out of engagement with such surface, and an annular lip projecting inwardly from and formed integrally with the inner edge of said body, said lip having an inner shaft engaging edge and being inclined in the direction of the stated abutment surface, so that when axial thrust is applied to the outer edge portion of said thrust receiving face, turning movement is set up throughout the seal about said rounded inner edge portion of the abutment face as a pivot for urging the inner edge of said lip into a tight sealing engagement with a shaft to which the seal is applied.

References Cited by the Examiner
UNITED STATES PATENTS

| | | | |
|---|---|---|---|
| 1,057,656 | 4/1913 | Miller et al. | 277—187 X |
| 2,721,749 | 10/1955 | Crow | 277—212 X |
| 3,004,807 | 10/1961 | Kniepkamp | 308—187.1 |
| 3,054,620 | 9/1962 | Schwing | 277—187 X |
| 3,069,174 | 12/1962 | Skinner | 277—175 X |
| 3,171,659 | 3/1965 | Anderson et al. | 277—33 |

LAVERNE D. GEIGER, *Primary Examiner.*

SAMUEL ROTHBERG, *Examiner.*

J. MEDNICK, *Assistant Examiner.*